_United States Patent_ [19]

Snyder

[11] 4,002,112
[45] Jan. 11, 1977

[54] COOKING APPLIANCE WITH REMOVABLE COOKING GRIDS

[75] Inventor: Paul V. Snyder, Whitehall, Pa.
[73] Assignee: General Electric Company, Bridgeport, Conn.
[22] Filed: July 21, 1975
[21] Appl. No.: 597,835
[52] U.S. Cl. .................................. 99/376; 99/422; 219/458; 219/524
[51] Int. Cl.² ..................................... A47J 37/06
[58] Field of Search .................... 99/331, 376, 422; 219/447, 458, 459, 464, 524, 525

[56] References Cited

UNITED STATES PATENTS

| | | | |
|---|---|---|---|
| 2,784,663 | 3/1957 | Rand et al. | 99/376 |
| 2,786,298 | 3/1957 | Roll et al. | 219/525 X |
| 2,881,299 | 4/1959 | Jepson | 99/376 X |
| 2,903,959 | 9/1959 | Wagner et al. | 99/376 |
| 3,172,999 | 3/1965 | Sutton et al. | 219/524 |
| 3,348,470 | 10/1967 | Swanson | 99/331 |

FOREIGN PATENTS OR APPLICATIONS 493,620   6/1953   Canada ............... 99/376

Primary Examiner—Volodymyr Y. Mayewsky
Attorney, Agent, or Firm—Leonard J. Platt; George R. Powers; John F. Cullen

[57] ABSTRACT

An electric cooking appliance wherein a removable cooking grid is provided with a latch-receiving slot at its side to enable the cooking grid to be readily removably connected to a cooking appliance housing. A spring wire latch is uniquely shaped and rotatably mounted on a side wall of the appliance housing for cooperating with the slot for reliably retaining the cooking grid on the appliance.

8 Claims, 5 Drawing Figures

COOKING APPLIANCE WITH REMOVABLE COOKING GRIDS

BACKGROUND OF THE INVENTION

This invention relates to an electric cooking appliance and, more particularly, to an arrangement for detachably holding a cooking grid on a cooking appliance.

In the manufacture of broilers, grills, waffle irons and the like, it is conventional to provide a cooking grid which may be removed from the appliance for cleaning. Cooking appliances of this type have included a number of different types of latches and spring clips which engage the cooking appliance housing and the grids in a number of different ways to hold these parts to each other and in order to prevent their inadvertent separation while food is being cooked and moved on the grid. While the spring clips and latching arrangements have been constructed and shaped in a number of different ways for holding the grids on a cooking appliance, it is especially desirable that the latching arrangement be constructed so that it may be readily and conveniently operated without providing detailed instructions to an operator. It is absolutely necessary that the latching mechanism securely hold the grid on the cooking appliance while the appliance is being used with an upper cooking grid being held positioned upside down on top of a lower cooking grid. It is also desirable to provide a latching mechanism which may be manufactured at relatively low cost, and thus, it is most important that the latching mechanism include relatively few parts which may be readily assembled to each other to reliably hold the cooking grids on the cooking appliance.

In a prior U.S. Pat. No. 2,903,959, to E. A. Wagner et al., dated Sept. 15, 1959, and assigned to the same assignee as the present invention, two different metal clips are disclosed for holding cooking grids on a combination grill and waffle iron.

This invention is concerned with a generally similar cooking appliance which is provided with a removable cooking grid and, more particularly, with a unique reliable low cost construction for securely holding the cooking grids on the appliance.

Accordingly, it is a primary object of my invention to provide an improved grid latch construction which may be readily operated to reliably hold cooking grids on a cooking appliance.

It is a further object of my invention to provide a grid latching mechanism having relatively few parts which may be readily manufactured at relatively low cost.

SUMMARY OF THE INVENTION

In accordance with one of the aspects of this invention, my improved electric cooking appliance includes a housing having side walls and a generally horizontal bottom wall. An electric heating means is positioned within the housing and a cooking grid is shaped to be removably positioned on the housing adjacent to the heating means. A side of the grid is provided with a slotted keeper for holding the grid on the housing. The keeper includes a slot which is shaped to provide a raised retaining portion and a lower seating portion which face into the slot. The slot also includes a generally vertical open portion located adjacent to the raised retaining portion. A latch is provided for cooperating with the keeper to hold the grid on the housing. The latch has two legs and one of the legs extends generally inwardly within the housing toward the horizontal wall and along the inside of one of the side walls. The end portion of the inwardly extending leg is movably connected to the side wall and the other leg of the latch extends outwardly over the side wall. With this construction, the cooking grid may be positioned on the housing with the outwardly extending leg of the latch being located within the open portion of the slot. Then the cooking grid may be securely held on the appliance by simply moving the outwardly extending leg of the latch forwardly on top of the side wall over the raised retaining portion of the keeper and onto the lower seating portion of the keeper. Thus, the grid is securely held on the cooking appliance.

With this unique construction, a cooking grid may be readily positioned and held on an appliance without providing detailed instructions to an operator of the appliance. All the operator has to do is to place the grid in its normal position on the housing. In this position, the latch is aligned with the generally vertical open portion of the slot and any slight movement of the grid on the housing will simply locate the grid so that the latch is positioned in the slotted vertical open portion of the keeper. The upper surface of the grid in the vicinity of the keeper may be readily formed to provide an indication that forward movement of the latch will result in locking the grid to the housing. Thus, after the grid has been positioned on the housing, it may be locked to the housing by simply moving the end portion of the latch forwardly. During this movement, the latch will slide on an upper surface of the side wall over the raised portion of the keeper and onto the lower seating portion of the keeper wherein the latch holds the grid to the appliance. It can also be appreciated that the grid may be readily removed from the housing for cleaning by simply moving the outer end portion of the latch rearwardly over the raised portion of the keeper and back to its position within the vertical open portion of the keeper slot.

In addition, with this unique construction, only two relatively simple readily formed parts are required for holding the grid to the housing. The keeper may be formed of low cost sheet metal which may be readily stamped and permanently connected to the sides of the grid by a plurality of connecting tabs. The latch itself may be easily formed from a relatively small piece of spring wire and readily connected to the housing by a shoulder rivet. With this construction, there is no need to use enlarged flat spring clip latches or complex latch mechanisms. Accordingly, a grid latch which may be readily operated to reliably hold cooking grids on a cooking appliance is formed of relatively few low cost parts which may be readily manufactured and assembled to each other.

BRIEF DESCRIPTION OF THE DRAWING

Other objects and attendant advantages of the invention will be apparent from the following description taken in connection with the accompanying drawing in which.

DESCRIPTION OF THE PREFERRED EMBODIMENT

Figure 1:
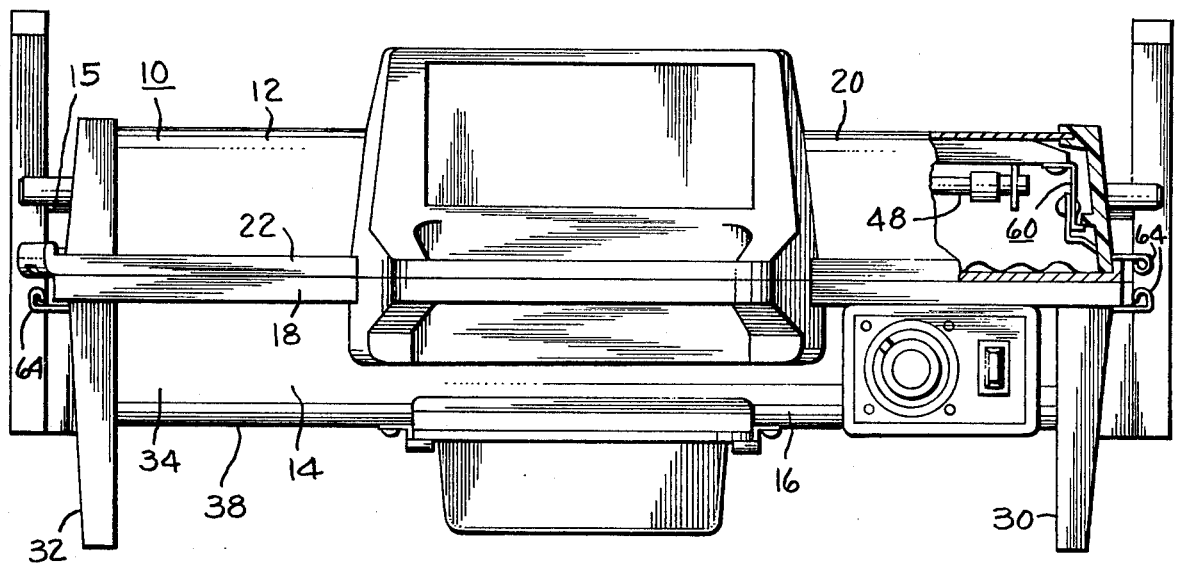
FIG. 1 is a front elevational view of a cooking appliance constructed in accordance with my invention having portions broken away and other portions shown in section.

Referring now to the drawing and first particularly to FIG. 1, there is shown an electric broiler grill which includes my unique construction for detachably holding cooking grids on the electric grill. As shown, the grill 10 comprises two casing halves 12 and 14 that are pivotally connected to each other by a pivot pin 15. The casing halves 12 and 14 are substantially identical to each other and therefore a description of the lower casing half 14 which includes a housing 16 and a cooking grid 18 will serve as a disclosure of both. With reference to FIG. 1, it can be seen that the upper casing half includes a housing 20 and a cooking grid 22 which is inverted on top of the cooking grid 18 and housing 16 of the lower casing half. Thus, in the description of the lower casing half, orientation nomenclature such as top and bottom, upper and lower should be inverted or reversed when it is applied to the upper casing half. Accordingly, in the patent application, all references to orientation such as upper and lower should be considered to be applicable only to the lower casing half which is being described and should not be considered to be limiting in any way.

Figure 3:
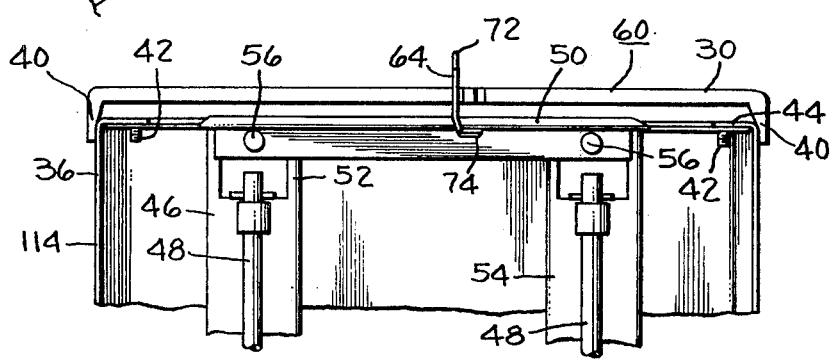
FIG. 3 is a fragmentary top plan view of the cooking appliance illustrated in FIG. 1 showing the lower casing half housing illustrated in FIG. 1 with the cooking grid removed and the latch in assembled relationship to the lower housing.
Figure 5:
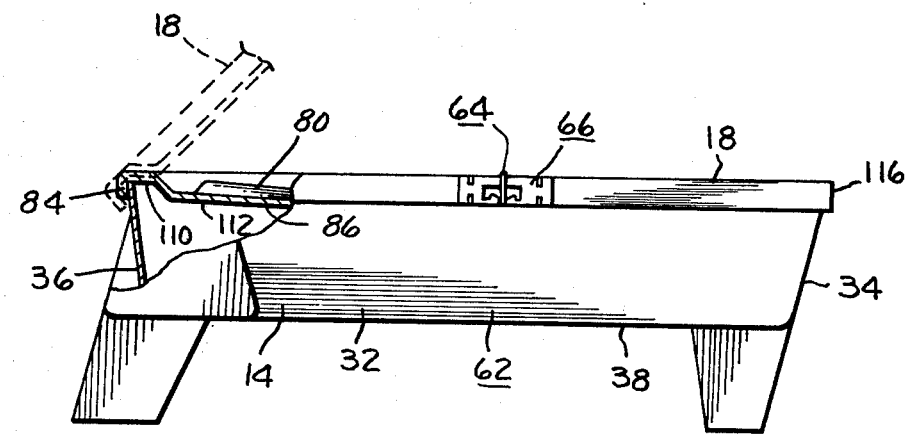
FIG. 5 is a left side elevational view of the lower half of the cooking appliance shown in FIG. 1 with the lower grid on the lower housing and with a portion of the grid being shown in dotted lines in a position in which it would be placed while it is being assembled to the lower housing.

As shown more particularly in FIGS. 1, 3 and 5, the lower housing includes a pair of side panels 30 and 32 that may be molded from a suitable general purpose phenolic or other heat-resistant material. The front, rear and bottom walls 34, 36 and 38, respectively, may be provided from a single piece of sheet metal which may be stamped in a generally U-shape. Suitable inwardly extending flanges 40 may be integrally formed with the phenolic side walls 30 and 32 for sandwiching the plate 34, 36, 38 between the side panels 30 and 32. A plurality of screws 42 may extend through the side panels 30 and 32 and through tabs 44 that may be provided on the front and rear walls 34 and 36, respectively, for connecting the front, rear and bottom walls to the side panels 30 and 32.

A sheet metal frame 46 is provided for holding a plurality of heating elements 48 within the lower housing. As shown in FIG. 3, the frame includes two sheet metal side plates 50 which extend along the inside of the side panels 30 and 32 and two transverse sheet metal members 52 and 54 which may be connected to the side plates 50 by means of rivets 56 or other suitable connecting means. The same screws 42 which hold the side panels 30 and 32 to the front, bottom and rear walls may also be used for connecting the frame and particularly the side plates 50 of the frame within the housing. Thus, a right side wall 60 of the housing includes the phenolic panel member 30 and a sheet metal side plate 50, while a left side wall of the housing includes the phenolic panel member 32 and a sheet metal plate 50.

GRID LATCH CONSTRUCTION

In accordance with my invention, a spring wire latch 64 is provided for removably connecting the cooking grids to their respective housings. In the preferred embodiment illustrated, there are two latches 64, one for each side of the grid 18. One latch 64 is connected to the right side wall 60 of the housing and the other latch 64 is connected to the left side wall 62 of the housing. Each of the latches 64 cooperate with a slotted keeper 66 which may be integrally formed with or, as shown in the preferred embodiment of my invention, formed as a clip 66 which is connected to the sides of the grid 18 by a plurality of inwardly extending tabs 68.

Figure 2:
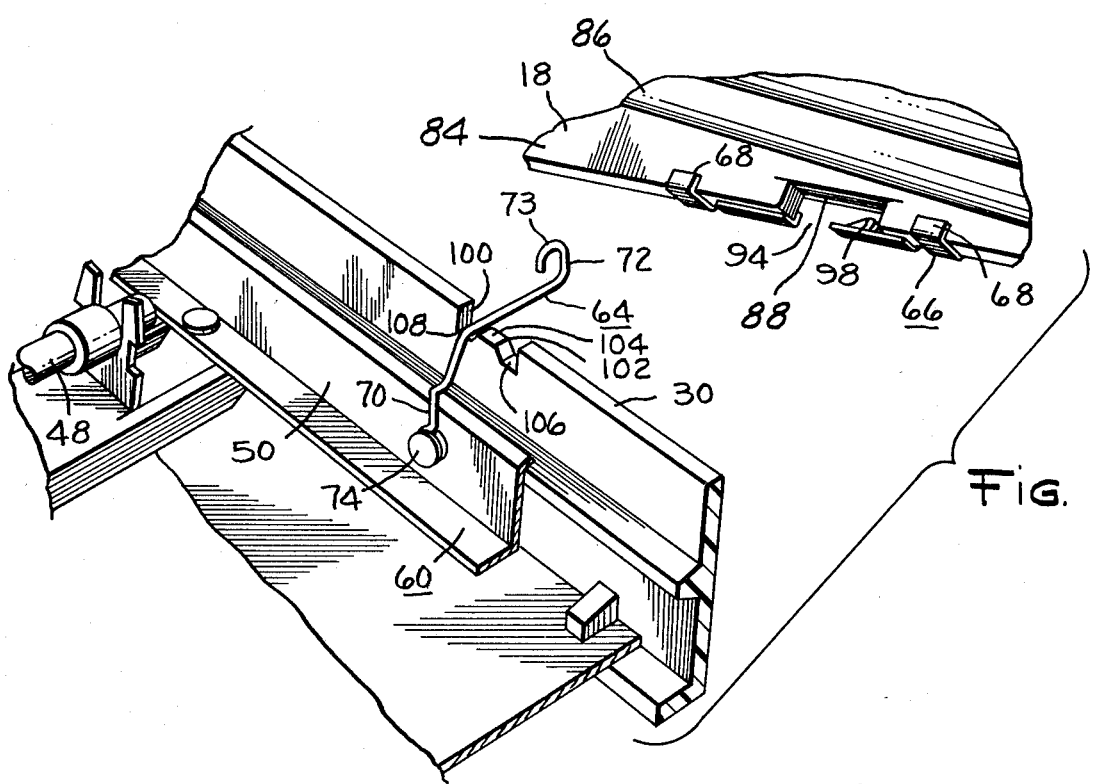
FIG. 2 is a fragmentary front top perspective view showing the housing for the lower half of the cooking appliance illustrated in FIG. 1 with a grid latch and lower housing in assembled relationship, and a bottom perspective view of a grid for the lower casing half with a keeper in assembled relationship with the grid and with the grid removed from the housing.
Figure 4:
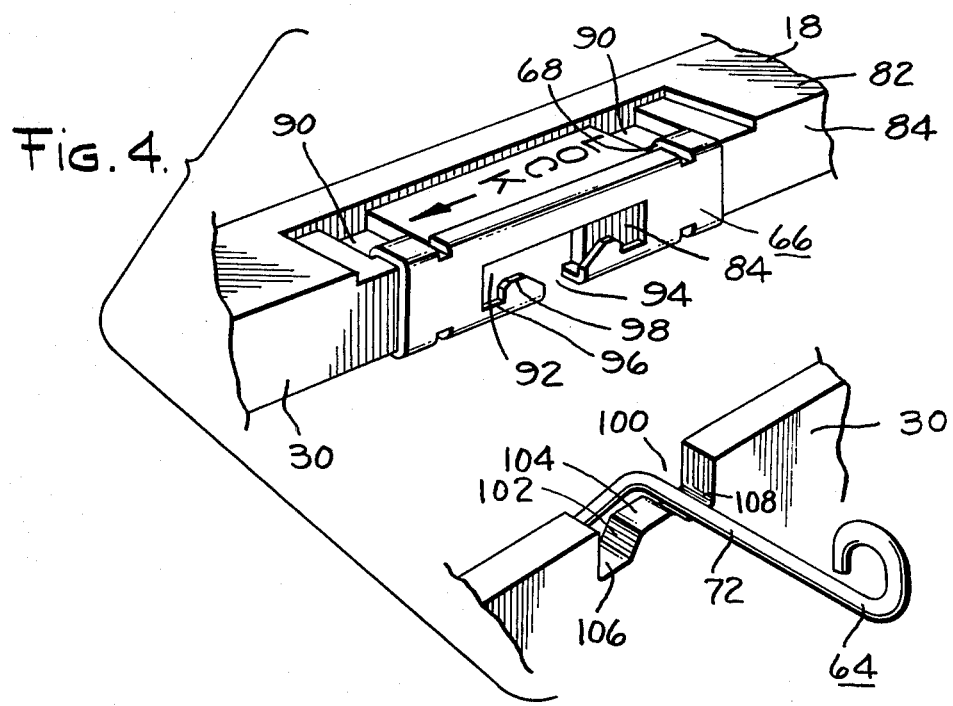
FIG. 4 is a fragmentary right side top perspective view of the appliance shown in FIG. 1 with the latch assembled to the lower housing of the appliance with the lower grid positioned above the lower housing and with the latch keeper in assembled relationship with the lower grid.

As shown more particularly in FIGS. 2, 3 and 4, the latch 64 is generally L-shaped and is provided with two legs 70 and 72. The leg 70 extends downwardly along the inside of the wall 60 and is formed to include an annulus 71 at its lower end portion so that it may be readily connected to the side plate 50 of the side wall 60 by mens of a shoulder rivet 74. The other leg 72 of the L-shaped latch extends generally outwardly from the side wall 60 of the housing and its outer end portion is turned on itself to provide an annulus 73 so that the latch 64 may be comfortably moved by an operator's finger and rotated about its shoulder rivet 74.

KEEPER

As shown more particularly in FIGS. 2 and 4, the cooking grid 18 includes an upper cooking surface 80, a generally flat marginal upper surface 82, and downwardly extending walls 84. As shown in FIG. 2, the downwardly extending walls 84 extend slightly beyond a marginal lower surface 86 of the grid. All of these walls and surfaces may be integrally cast with the grid 18 and, in addition, the side walls 84 include an integrally cast upwardly extending opening 88 for receiving the latch 64 and for cooperating with the keeper 66. The upper marginal surface 82 of the grid 18 is also provided with two spaced depressions 90 for suitably receiving the connecting tabs 68 of the keeper.

As shown in FIG. 4, the keeper clip 66 may be suitably stamped and formed from a small piece of sheet metal to include a generally horizontal slot 92 for receiving the outwardly extending leg portion 72 of the latch, and more particularly the leg 72 is positioned in an open vertical portion 94 of the slot 92. The clip also includes a lower seating surface 96 for the latch leg 72 and a raised retaining surface 98 for holding the latch on the clip.

In accordance with my invention, the spring wire latch 64 is uniquely guided from a position within the vertical open portion 94 of the slot 92 over the raised portion 98 of the keeper clip 66 and downwardly into the lower seating portion 96 of the clip. In order to achieve this, the latch 64 is formed from spring wire and is shaped and held by the shoulder rivet 74 so that it is spring biased downwardly onto the upper surface 102 of a downwardly extending notch 100 that is formed in the upper portion of the side panel 30. As shown more particularly in FIGS. 2 and 4, the upwardly facing surface 102 has a raised mid-portion 104, a lower downwardly extending front portion 106, and a downwardly extending lower rear portion 108 for slidable engagement with a lower surface portion of the outwardly extending leg 72 of the latch 64.

With particular reference to FIG. 4, it can be appreciated that when the grid 18 is placed on top of the side panel 30 with the latch 64 in the position illustrated, the outwardly extending leg 72 of the latch 64 will be positioned in the vertical open portion 94 of the slot 92 and the raised retaining portion 98 of the keeper will be located adjacent to the raised portion 104 of the notch with the keeper being positioned outside of the side surface of the panel 30. Thus, when it is desired to move the latch 64 to its locked position in order to hold the grid on the housing, the latch 64 is moved forwardly, as indicated by the arrow and the work "LOCK" which may be integrally cast with the grid 18. During forward movement of the latch, the lower surface of the leg 72 will slide on the lower surface 108 and the raised surface 104 of the notch 100. This movement of the wire latch 64 on the surfaces 108 and 104 will lift the latch above the raised retaining portion 98 of the keeper clip 66 to position the latch 64 within the lower seating portion 96 of the clip 66.

With particular reference to FIG. 4, it can be appreciated that the rear portion of the keeper clip beyond the vertical open portion 94 is not effective when the clip is connected to the lower right side of a cooking grid 18, the retaining surface 98 and the seating surface 96 being blocked by the downwardly extending side wall 84 of the grid. However, these surfaces would become effective when the clip 66 is connected to the left side of the lower grid 18. With the clips 66 being stamped with such double seating and raised retaining portions 96 and 98, respectively, it is only necessary to manufacture clips of the same size and shape since all of the clips will have surfaces which will be effective at both the right and left sides of the lower grid 18 as well as the right and left sides of the upper grid 22. Thus, the clips may be conveniently stored in one place and may be readily assembled in a foolproof way on the sides of the grids 18 and 22.

With particular reference to FIG. 5, it can be perceived that the downwardly extending side and rear walls 84 of the grid 18 provide a lower marginal surface 110 which is positioned above the lowermost portions of the side walls 84 and above an underside surface 112 of the grid 18. These indented marginal surfaces 110 permit te grid 18 to be readily located and positioned on the cooking appliance with the narrow upper surfaces 114, 116 and 118 of the rear, front, and sides of the housing, respectively, being located in contact with the lower marginal surface 110 of the grid. With this construction, in order to attach a grid 18 to an appliance housing, it is merely necessary to position the grid 18 in the dotted line position shown in FIG. 5 with the upper surface 114 of the rear wall in contact with the marginal surface 110 of the grid and then gradually lower the grid 18 until the marginal lower front surface 110 of the grid is positioned on top of the upper surface 116 of the front wall 34. When this is accomplished, the outwardly extending legs 72 of the latches 64 will be located within the vertical open portions 94 of the slot. Then the cooking grid 18 may be securely held on the appliance by simply moving the outwardly extending legs 72 of the latch forwardly on top of the side wall 30 and, more particularly, its notch surfaces 108 and 104. During this movement it can be appreciated that the latch 64 will be lifted over the raised retaining portion 98 of the keeper and onto the seating portion 96 of the keeper. Thus, the grid is securely held in place on the cooking appliance.

From the foregoing description, it will be appreciated that with my unique grid latch construction a cooking grid mmay be readily positioned and held on an appliance without providing detailed instructions to an operator of the appliance. All the operator has to do is to place the grid 18 in the position illustrated in FIG. 5. In this position, the latch 64 is aligned with the generally vertical slot portion 94 and the grid 18 is appropriately seated on the housing. Then the latches 64 are simply moved forwardly to move them over the retaining portions 98 of the keeper and onto the seating portions 96. In this position, the downward spring force of the latch 64 will hold the grids against the upper surfaces 114, 116 and 118 of the housing.

Moreover, with this unique construction, only two relatively simple readily formed parts are required for holding the grid to the housing. The keeper 66 may be formed of low cost sheet metal which may be readily stamped and connected to the sides of the grid 18 while the latch itself may be easily formed from a relatively small piece of spring wire.

Accordingly, it will be appreciated that the parts of my unique grid latch mechanism may be readily formed and connected to each other and to the other parts of the cooking appliance. Thus, an exceedingly simple yet reliable grid latch construction has been achieved.

What I claim is:

1. An electric cooking appliance comprising:
   a. a housing including side walls and a generally horizontal wall;
   b. electric heating means positioned within said housing;
   c. a cooking grid being shaped to be removably positioned on said housing;
   d. keeper means having a slot provided at the side of said grid, said keeper means including a raised retaining portion and a lower seating portion facing into said slot, and said slot including a generally vertical open portion located adjacent to said raised retaining portion; and
   e. a latch having two legs, one of the legs extending generally inwardly within the housing toward the horizontal wall and along the inside of one of the side walls, the end portion of said inwardly extending leg being movably connected to said side wall, the other leg of said latch extending outwardly over said side wall so that said cooking grid may be positioned on said housing with the outwardly extending leg of said latch being located within the open portion of said slot and the cooking grid may be held on the cooking appliance by moving the latch over the raised portion of the keeper and onto the lower seating portion of the keeper wherein the latch and the keeper hold the grid on the cooking appliance.

2. A cooking appliance as defined in claim 1 wherein the keeper is a spring clip which may be readily connected to a side of the cooking grid, said clip being shaped from generally flat sheet metal to include a side wall which is arranged to extend along the outside surface of the side of the grid, relatively short upper and lower walls which extend inwardly from the side wall to grip upper and lower surfaces of the grid, respectively, and said upper and lower walls including a pair of inwardly extending tab portions for securely holding the clip on the side of said cooking grid, the slot, the raised retaining portion, the lower seating portion and the open portion of said keeper being formed in the side wall of said clip.

3. An electric cooking appliance comprising:
 a. a housing including two side walls, a front wall, a rear wall, and a generally horizontal wall;
 b. electric heating means positioned within said housing;
 c. a cooking grid being shaped to be removably positioned on said housing;
 d. keeper means having a generally horizontal slot provided at the side of said grid, said keeper means including a raised retaining portion and a lower seating portion facing into said horizontal slot, and said slot including a generally vertical open portion located adjacent to said raised retaining portion; and
 e. a generally L-shaped spring latch having two legs, one of the legs extending generally inwardly within the housing toward the horizontal wall and along the inside of one of the side walls, the end portion of said downwardly extending leg being rotatably connected to said side wall, the other leg of said spring latch extending outwardly over said side wall and being spring biased downwardly into engagement with said side wall so that said cooking grid may be positioned on said housing with the outwardly extending leg of said latch being located within the open portion of said slot and the cooking grid may be held on the cooking appliance by lifting the wire latch against its spring bias over the raised portion of the keeper and on to the lower seating portion of the keeper wherein the spring bias of the latch pushes the keeper and the grid toward the horizontal wall to hold the grid on the cooking appliance.

4. A cooking appliance as defined in claim 3 wherein the side wall is provided with a downwardly extending notch for receiving the outwardly extending leg of the spring latch, said notch including an upwardly facing surface having a raised mid-portion, a lower front portion and a lower rear portion for receiving a lower surface portion of the outwardly extending leg of said spring latch so that the outwardly extending leg of the latch may be pushed forwardly or rearwardly to selectively snap the latch over the raised portion of the notch and on to the front or rear lower portions of said notch.

5. A cooking appliance as defined in claim 4 wherein the notch in the side wall of the cooking appliance is related to the keeper at the side of the cooking grid when the cooking grid is loosely positioned on the housing so that the open portion of the slot is in line with the lower rear portion of said notch so that the outwardly extending leg of the wire latch extends outwardly through the lower rear portion of the notch and the open portion of the keeper slot to generally locate the grid on the cooking appliance housing, the outer end portion of said wire latch being movable forwardly to slide the latch on the raised mid-portion of the notch over the raised retaining portion of the keeper and on to the lower seating portion of the keeper.

6. A cooking appliance as defined in claim 3 wherein the spring latch is formed from a piece of wire and wherein the end portion of the downwardly extending leg is formed in the shape of a generally annular eye for receiving a shoulder rivet in order to rotatably connect the latch to the side wall of the cooking appliance.

7. A cooking appliance as defined in claim 6 wherein the outwardly extending end portion of the spring wire latch is bent in the general shape of an annulus so that the latch may be comfortably moved by an operator's finger and snapped over the raised mid-portion of the notch.

8. An electric cooking appliance comprising:
 a. a housing including two side walls, a front and a rear wall, and a bottom wall, the front, rear and side walls including inner and outer surfaces and relatively narrow upwardly extending surfaces;
 b. electric heating means positioned within said housing;
 c. a cooking grid being shaped to be removably positioned on said housing, said grid including an upper cooking surface, downwardly extending front, rear and side walls and a marginal lower surface positioned above the lower portions of said downwardly extending front, rear and side walls so that said grid may be readily positioned on said cooking appliance with the narrow upper surfaces of the front, side and rear walls of the housing being located in contact with the lower marginal surface of the grid and with the downwardly extending front, rear and side walls of the grid being positioned for engagement with the outside surfaces of the front, rear and side walls of the cooking appliance;
 d. a keeper means having an upwardly extending slot provided at the side of said grid, said keeper including an open portion, a raised retaining portion, and a lower seating portion; and
 e. a generally L-shaped spring latch having two legs, one of the legs extending generally downwardly within the housing along the inside of one of the side walls, the end portion of said downwardly extending leg being rotatably connected to said side wall, the other leg of said spring latch extending outwardly over an upwardly facing surface of said side wall and being spring biased downwardly into engagement with said upper surface so that said cooking grid may be positioned on said housing with the outwardly extending leg of said wire latch being located within the open portion of said keeper and the cooking grid may be held on the cooking appliance by lifting the wire latch against its spring bias over the raised portion of the keeper and on to the lower seating portion of the keeper wherein the downward spring bias of the latch pushes the keeper and the grid downwardly to hold the grid on the cooking appliance.

* * * * *